United States Patent [19]

Yasui et al.

[11] 4,363,850
[45] Dec. 14, 1982

[54] MAGNETIC RECORDING MEDIUM

[75] Inventors: Masaaki Yasui; Takeshi Matsuura, both of Kyoto; Seiji Watatani, Osaka, all of Japan

[73] Assignee: Hitachi Maxell, Ltd., Osaka, Japan

[21] Appl. No.: 200,133

[22] Filed: Oct. 24, 1980

[30] Foreign Application Priority Data

Oct. 24, 1979 [JP] Japan ................................ 54/137352

[51] Int. Cl.³ .............................................. G11B 5/70
[52] U.S. Cl. .................................. 428/329; 252/62.54; 360/134; 428/425.9; 428/694; 428/900
[58] Field of Search ...................... 428/425.9, 900, 694, 428/695, 329; 252/62.54, 62.53; 427/128; 360/134, 135, 136

[56] References Cited

U.S. PATENT DOCUMENTS

| | | | |
|---|---|---|---|
| 4,049,871 | 9/1977 | Ogawa et al. | 428/425.9 |
| 4,115,290 | 9/1978 | Kubota et al. | 252/62.54 |
| 4,223,361 | 9/1980 | Zuitsu et al. | 428/900 |
| 4,275,115 | 6/1981 | Nanuse | 252/62.54 |

Primary Examiner—Stanley S. Silverman
Attorney, Agent, or Firm—Birch, Stewart, Kolasch & Birch

[57] ABSTRACT

A magnetic recording medium which comprises a base material and a magnetic layer provided thereon. The magnetic layer comprises magnetic particles, a cellulose resin and a polyurethane resin as the binders and $\alpha$-$Fe_2O_3$ particles, whereby the dispersibility of the magnetic particles in the magnetic layer is enhanced without deterioration of the durability of the magnetic layer.

2 Claims, 5 Drawing Figures

MAGNETIC RECORDING MEDIUM

BACKGROUND OF THE INVENTION

The present invention relates to a magnetic recording medium. More particularly, it relates to a magnetic recording medium of which the magnetic layer has a high durability and contains magnetic particles in a good dispersion state.

In general, the magnetic layer of a magnetic recording medium is formed by applying a magnetic coating composition comprising magnetic particles, a binder and an organic solvent onto the surface of a base material such as a polyester film. Such magnetic layer is required to have a high durability since it runs slidingly in close contact with a magnetic head on recording and reproducing of the magnetic recording medium. Further, the magnetic particles in the magnetic layer are required to be uniformly dispersed so as to have a high sensitivity and a good S/N ratio.

For attaining the said requirements, the binder in the magnetic coating composition is desired to be one which can make the magnetic particles disperse well and also keep a high durability of the magnetic layer. From this viewpoint, various binders have been proposed, among which a mixture of a cellulose resin and a polyurethane resin is particularly recommendable. However, the durability brought by such mixture is still not satisfactory. In order to overcome this defect, the incorporation of non-magnetic $Cr_2O_3$ particle into the magnetic layer has been proposed, but this proposal produces other drawbacks. That is, when $Cr_2O_3$ particles are admixed with other components in a conventional mixing machine, such as a ball mill, over a long period of time or when a relatively large amount of $Cr_2O_3$ particles is used for incorporation into a magnetic coating composition, the particles gel, and the dispersibility deteriorates, wherein the magnetic characteristics of the resulting magnetic recording medium are lowered.

SUMMARY OF THE INVENTION

As the result of an extensive study to overcome the said drawbacks, it has been found that the use of α-ferric oxide (α-$Fe_2O_3$) particles, in place of $Cr_2O_3$ particles, produces no gellation even when the mixation is effected over a long period of time or a relatively large amount of such particles is employed, and attains a good dispersion state of the magnetic particles with a high durability of the magnetic layer. Thus, the use of α-$Fe_2O_3$ particles instead of $Cr_2O_3$ particles in magnetic layer comprising magnetic particles with a cellulose resin and a polyurethane resin as the binders can increase the durability of the magnetic recording medium without deterioration of the dispersibility of the magnetic particles in the magnetic layer.

DETAILED DESCRIPTION

Figure 1:
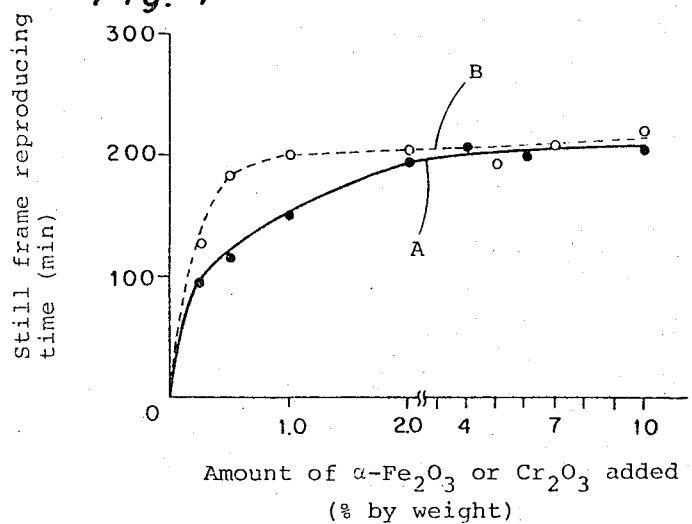

According to the present invention, there is provided a magnetic recording medium comprising a base material and a magnetic layer provided on the surface of such base material, the magnetic layer containing magnetic particles with a cellulose resin and a polyurethane resin as the binders, which is characterized in that the magnetic layer further contains α-$Fe_2O_3$ particles.

As the base material, there may be, for instance, a polyester film, an acetylcellulose film, a polyamide film or a polyimide film. When the magnetic recording medium is a magnetic recording tape, the use of a polyester film having a thickness of 5 to 100μ as the base material is particularly preferable.

The magnetic particles to be used in the invention are desired to have a particle size of 1μ or less, preferably of 0.1 to 1μ, and an axis ratio (long axis/short axis) of 2 or more, preferably of 5 to 15, for obtaining an excellent magnetic recording medium. Examples of such magnetic particles are ferro-magnetic iron oxide particles such as γ-$Fe_2O_3$ particles and $Fe_3O_4$ particles and their magnetically modified products obtained by introduction of metal atoms such as cobalt atom, chromium dioxide particles and strongly magnetic metal particles such as iron, cobalt and nickel.

The binder to be used is a mixture of a cellulose resin and a polyurethane resin. As the cellulose resin, there may be employed nitrocellulose, acetylcellulose, acetylbutylcellulose, methylcellulose, ethylcellulose, benzylcellulose, etc. Among them, nitrocellulose is the most preferable, because it has a good miscibility with magnetic particles and can maintain a good dispersion state of magnetic particles. Specific examples of nitrocellulose are "Nitrocellulose H ¼", "Nitrocellulose H½", "Nitrocellulose H1", "Nitrocellulose H 5", etc. manufactured by Asahi Chemical Ind. Ltd., "Nitrocellulose RS 1/16", "Nitrocellulose RS ½", "Nitrocellulose RS 1", "Nitrocellulose RS2", etc. manufactured by Daicel, Ltd., and the like. As the polyurethane resin, there is usable an urethane elastomer not having a free isocyanate group. The polyurethane resin of this kind has a good compatibility with the cellulose resin and serves as a plasticizer to the cellulose resin. Thus, it is effective in making the magnetic layer elastic and enhancing the durability of the magnetic layer. Specific examples of the said urethane elastomer are "Pandex T-5250", "Pandex T-5102A", etc. manufactured by Dainippon Ink Chem. Ind. Ltd., "Nipporan No. 2304", "Paraprene 22S", "Paraprene 26S", etc. manufactured by Nippon Polyurethane Ind. Ltd., "Estan 5702", "Estan 5715", "Estan 5711", etc. manufactured by Goodrich Chemical Co., and the like. The weight proportion of the cellulose resin and the polyurethane resin is preferred to be in a range of 10:90 and 70:30.

If necessary, any other conventional binder may be additionally employed. Examples of such conventional binders are vinyl chloride-vinyl acetate copolymer, polyvinyl butyral, polyester resin, etc. For increasing the film strength and durability of the magnetic layer, it is particularly preferred to incorporate a trifunctional isocyanate compound of low molecular weight into a mixture of the cellulose resin and the polyurethane resin. Examples of such trifunctional isocyanate compound are "Colonate L" manufactured by Nippon Polyurethane Ind. Ltd., "Desmodur L" manufactured by Bayer A. G., "Takenate D102" manufactured by Takeda Chemical Ind. Ltd., etc. It is usually employed in an amount of 5 to 25 parts by weight to 100 parts by weight of the combined amount of the cellulose resin and the polyurethane resin.

α-$Fe_2O_3$ particles to be used have usually a granular shape and an average particle size of 0.5 to 2.0μ. Its amount may be from 0.5 to 10% by weight based on the weight of the magnetic particles. When the amount is less than the lower limit, a satisfactory durability is not obtained. When the amount is more than the upper limit, the output of the magnetic particles is lowered.

For preparation of the magnetic recording medium, there may be employed any per se conventional method. For example, a magnetic coating composition is prepared by mixing the magnetic particles, the binders and $\alpha$-$Fe_2O_3$ particles, optionally with any other additive, in a suitable organic solvent (e.g. toluene, xylene, methyl isobutyl ketone, methyl ethyl ketone, cyclohexanone, tetrahydrofuran, ethyl acetate). Examples of the other additive are dispersing agents (e.g. lecithin), lubricants (e.g. lauric acid, myristic acid, n-butyl stearate, zinc stearate, liquid paraffin), plasticizers (e.g. dioctyl phthalate, dibutyl phthalate), etc. The magnetic coating composition thus prepared is applied onto the surface of a base material by a conventional means such as a roll coater (e.g. gravure coater, reverse coater), a blade coater or an air knife coater, followed by drying. The thickness of the magnetic layer after drying is usually from 2 to $20\mu$.

The magnetic recording medium thus prepared has a magnetic layer, which contains usually the magnetic particles in an amount of 60 to 85% by weight on the basis of the magnetic layer.

PREFERRED EMBODIMENTS

Practical and presently preferred embodiments of the invention are illustratively shown in the following Examples wherein part(s) and % are by weight.

EXAMPLE 1

To a mixture of magnetic particles (Co-$\gamma$-$Fe_2O_3$) of average particle size of $0.4\mu$ (600 parts), a polyurethane resin ("Pandex T-5250" manufactured by Dainippon Ink Ind. Ltd.) (61 parts), a cellulose resin ("Nitrocellulose H ½" manufactured by Asahi Chemical Ind. Ltd.) (54 parts), a trifunctional isocyanate compound of low molecular weight ("Colonate L" manufactured by Nippon Polyurethane Ind. Ltd.) (20 parts), cyclohexanone (600 parts) and toluene (600 parts), $\alpha$-$Fe_2O_3$ particles (granular shape; average particle size, about $1.0\mu$; hardness (Mohs' scale), (6) (1.5 to 60 parts, i.e. 0.25 to 10% to the weight of the magnetic particles) was added, and the resultant mixture was mixed well in a ball mill for 96 hours to make a magnetic coating composition.

The magnetic coating composition was applied onto the surface of a polyester film of $14\mu$ thick, followed by drying to make a magnetic layer of about $5\mu$ thick. The resulting film was calendered at a roll temperature of 80° C. under a pressure of 220 kg/cm with a speed of 10 m/minute and cut to give a magnetic recording tape.

EXAMPLE 2

In the same manner as in Example 1 but using $\alpha$-$Fe_2O_3$ particles in an amount of 24 parts, i.e. 4% to the weight of the magnetic particles and mixing in a ball mill for 12 to 120 hours, there was prepared a magnetic coating composition. By the use of the coating composition, a magnetic recording tape was prepared.

EXAMPLE 3

In the same manner as in Example 1 but using $\alpha$-$Fe_2O_3$ of average particle sise of 0.1 to $10\mu$ in an amount of 24 parts, i.e. 4% to the weight of the magnetic particles, there was prepared a magnetic coating composition. By the use of the coating composition, a magnetic recording tape was prepared.

COMPARATIVE EXAMPLE 1

In the same manner as in Example 1 but using $Cr_2O_3$ particles (average particle size, about $1.0\mu$) (1.5 to 60 parts, i.e. 0.25 to 10% to the weight of the magnetic particles) in place of $\alpha$-$Fe_2O_3$ particles, there was prepared a magnetic coating composition. By the use of the coating composition, a magnetic recording tape was prepared.

COMPARATIVE EXAMPLE 2

In the same manner as in Example 2 but using $Cr_2O_3$ particles in place of $\alpha$-$Fe_2O_3$ particles, there was prepared a magnetic coating composition. By the use of the coating composition, a magnetic recording tape was prepared.

Figure 2:
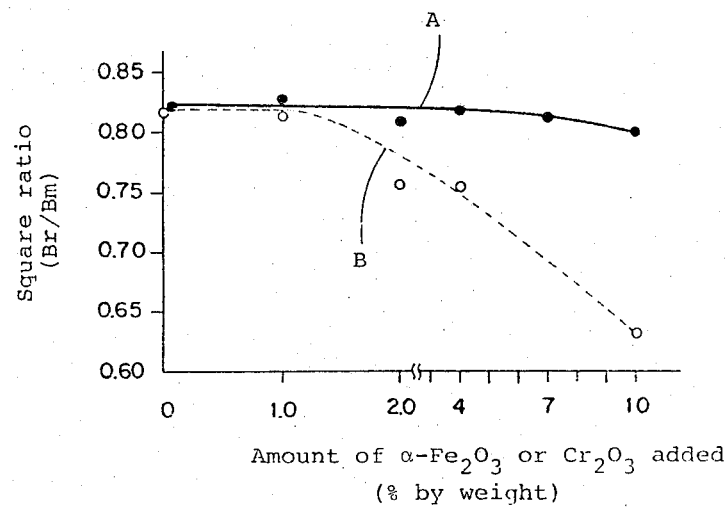
Figure 3:
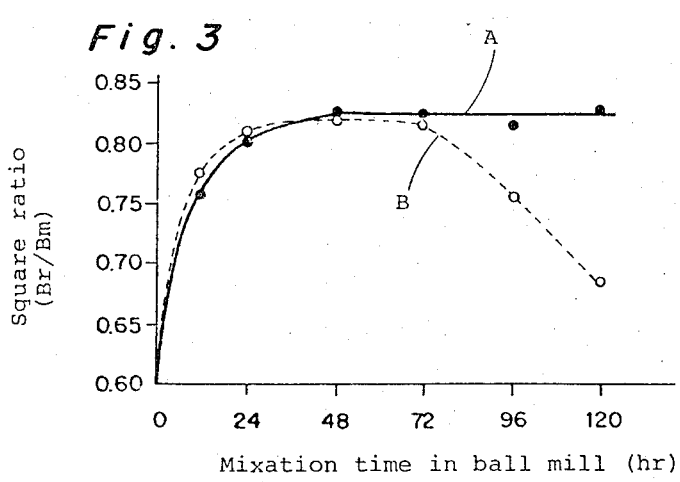

With respect to the magnetic recording tapes as prepared in Example 1 and Comparative Example 1, the relationship between the amount of $\alpha$-$Fe_2O_3$ particles or $Cr_2O_3$ particles and the retention time of a still image was plotted on a graph to give curves as shown in FIG. 1 of the accompanying drawings, and the relationship between the amount of $\alpha$-$Fe_2O_3$ particles or $Cr_2O_3$ particles and the square ratio (Br/Bm) was plotted on a graph to give curves as shown in FIG. 2. With respect to the magnetic recording tapes as prepared in Example 2 and Comparative Example 2, the relationship between the mixation time in the ball mill and the square ratio (Br/Bm) was plotted on a graph to give curves as shown in FIG. 3. Throughout these Figures, Curve A indicates the one obtained with the magnetic recording tapes of Examples and Curve B indicates the one obtained with the magnetic recording tapes of Comparative Examples.

Figure 4:
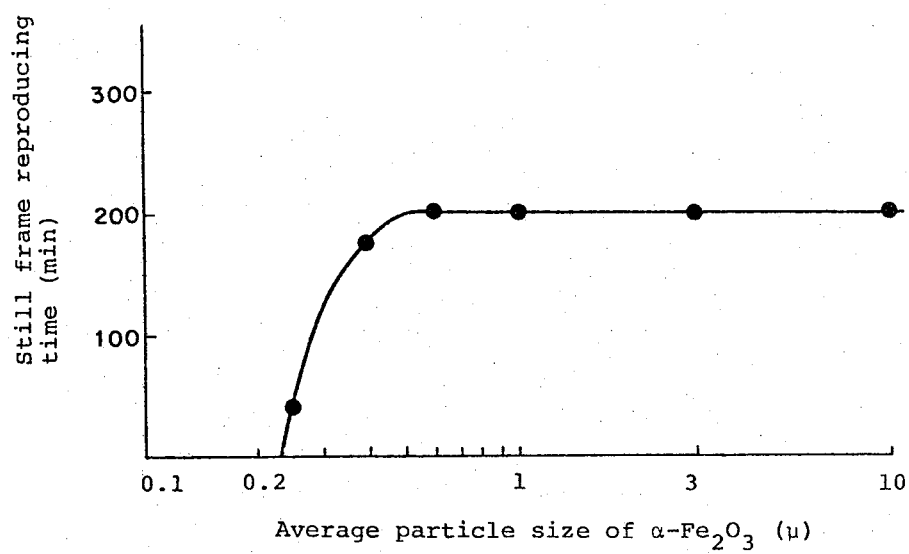
Figure 5:
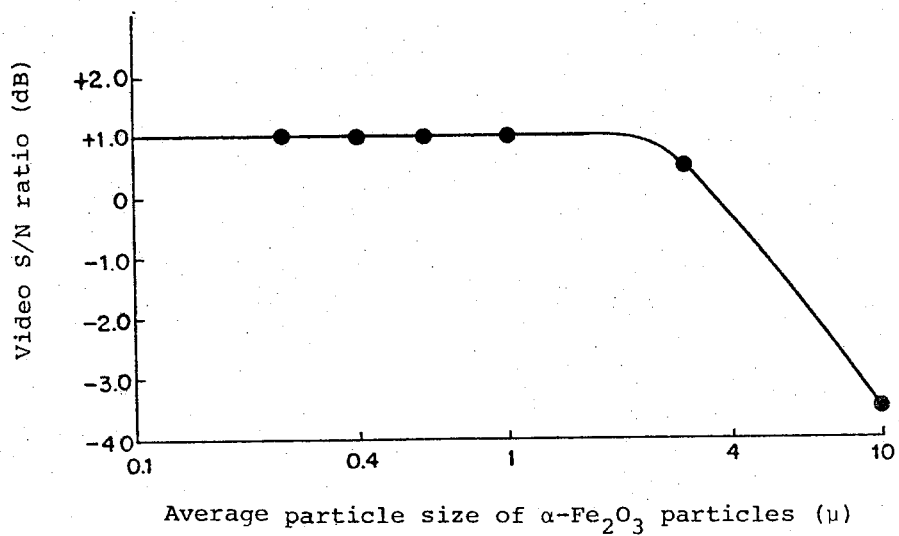

With respect to the magnetic recording tapes as prepared in Example 3, the relationship between the average particle size of $\alpha$-$Fe_2O_3$ particles and the retention time of a still image was plotted on a graph to give a curve as shown in FIG. 4, and the relationship between the average particle size of $\alpha$-$Fe_2O_3$ particles and the video S/N ratio (dB) was plotted on a graph to give a curve as shown in FIG. 5.

The still frame reproducing time was measured by the following procedure: the magnetic recording tape was incorporated into a video cassette (VHS process, T-120 type) and set in a video tape recorder (VT 3000, manufactured by Hitachi, Ltd.); under the conditions of a temperature of 5° C. and a relative humidity of 80%, the magnetic recording tape in a stationary state was contacted with a magnetic head under rotation on the side of the magnetic layer; the time until a reproduced stationary image on the picture tube disappeared due to the clogging of the spaces in the magnetic head with the powders produced from the abrasion of the magnetic layer on the contact with the magnetic head was measured. Thus, the still frame reproducing time is an appropriate index of the durability of a magnetic recording tape, and a longer retention time indicates a better durability. On the other hand, the square ratio is an index of the dispersibility of the magnetic particles in the magnetic layer, and a larger square ratio indicates a better dispersion state. Further, the video S/N ratio (dB), which represents the ratio of the value with the tested tape determined in the same manner as for the still frame reproducing time by the use of a video tape recorder to the value with the standard tape in the dB unit, is an index of the smoothness at the surface of the magnetic layer, and a larger video S/N ratio indicates a higher smoothness at the surface.

As understood from FIGS. 1 to 3, the magnetic recording tape having a magnetic layer comprising $Cr_2O_3$ particles affords a long still frame reproducing time and is excellent in durability. When, however, the amount of $Cr_2O_3$ particles is increased or the mixation time is made longer, the square ratio is markedly lowered. The magnetic recording tape having a magnetic layer comprising $\alpha\text{-}Fe_2O_3$ particles affords a sufficient still frame reporducing time (more than 2 hours) and is satisfactorily durable when the amount is not less than 0.5% by weight. Even when the amount of $\alpha\text{-}Fe_2O_3$ is increased or the mixation time is made longer, no material depression in the square ratio is observed. Thus, the use of $\alpha\text{-}Fe_2O_3$ particles is effective in improvement of the durability without deterioration of the dispersibility.

As understood from FIG. 4, when the average particle size is less than $0.5\mu$, $\alpha\text{-}Fe_2O_3$ particles are inferior in durability, and thus the still frame reproducing time is so short as lacking the practical utility. On the other hand, as shown in FIG. 5, the surface of the magnetic layer is hardly smooth and the video S/N ratio is lowered, when the average particle size of $\alpha\text{-}Fe_2O_3$ particles is more than $2.0\mu$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium comprising a base material and a magnetic layer provided on the surface of said base material, said magnetic layer consisting essentially of magnetic particles and $\alpha\text{-}Fe_2O_3$ granular particles dispersed in a binder consisting essentially of a cellulose resin and a polyurethane resin, said $\alpha\text{-}Fe_2O_3$ particles being present in an amount of 0.5 to 10 percent by weight based on the weight of the magnetic particles, and having an average particle size of 0.5 to $2.0\mu$.

2. The magnetic recording medium according to claim 1 wherein the magnetic layer further contains a trifunctional isocyanate compound having a low molecular weight in an amount of 5 to 25 parts by weight to 100 parts by weight of the combined amount of the cellulose and polyurethane resin.

* * * * *